(12) United States Patent
Sottek (10) Patent No.: US 12,079,899 B2
(45) Date of Patent: *Sep. 3, 2024

(54) MODIFYING GRAPHICS RENDERING BY TRANSCODING A SERIALIZED COMMAND STREAM

(71) Applicant: ROKU, INC., San Jose, CT (US)

(72) Inventor: Matthew James Sottek, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,793

(22) Filed: May 8, 2023

(65) Prior Publication Data

US 2023/0360168 A1 Nov. 9, 2023

Related U.S. Application Data

(63) Continuation of application No. 17/825,172, filed on May 26, 2022, now Pat. No. 11,682,102, which is a continuation of application No. 16/921,321, filed on Jul. 6, 2020, now Pat. No. 11,348,199.

(51) Int. Cl.
*G06T 1/60* (2006.01)
*G09G 5/39* (2006.01)

(52) U.S. Cl.
CPC .............. *G06T 1/60* (2013.01); *G09G 5/39* (2013.01)

(58) Field of Classification Search
CPC .................................. G06T 1/60; G09G 5/39
USPC ........................................................ 345/522
See application file for complete search history.

(56) References Cited

U.S. PATENT DOCUMENTS

| | | |
|---|---|---|
| 11,348,199 B2 | 5/2022 | Sottek |
| 2008/0141131 A1 | 6/2008 | Cerny et al. |
| 2008/0303833 A1 | 12/2008 | Swift et al. |
| 2008/0303835 A1 | 12/2008 | Swift et al. |
| 2010/0295871 A1 | 11/2010 | Dua |
| 2011/0157196 A1 | 6/2011 | Nave et al. |
| 2011/0227935 A1 | 9/2011 | Abdo et al. |
| 2013/0057561 A1 | 3/2013 | Nave et al. |
| 2013/0176322 A1 | 7/2013 | Bakalash et al. |
| 2015/0177822 A1 | 6/2015 | Shoshan |
| 2018/0275833 A1 | 9/2018 | Walsh et al. |
| 2022/0351328 A1 | 11/2022 | Sottek |

*Primary Examiner* — Jacinta M Crawford
(74) *Attorney, Agent, or Firm* — Sterne, Kessler, Goldstein & Fox P.L.L.C.

(57) ABSTRACT

Disclosed herein are system, method, and computer program product embodiments for modifying graphics rendering by transcoding a serialized command stream. An embodiment operates by receiving a command configured to instruct an API to render a graphics element. The embodiment further operates by generating, based on the command, a transcoded command configured to instruct the API to render a modified graphics element by applying a set of modification factors to a portion of the command. Subsequently, the embodiment operates by transmitting the transcoded command to the API.

20 Claims, 5 Drawing Sheets

MODIFYING GRAPHICS RENDERING BY TRANSCODING A SERIALIZED COMMAND STREAM

RELATED APPLICATION

This application is a continuation of U.S. patent application Ser. No. 17/825,172, filed on May 26, 2022, now allowed, which is continuation of U.S. patent application Ser. No. 16/921,321, filed on Jul. 6, 2020, now patented which is incorporated by reference herein its entirety.

BACKGROUND

Field

This disclosure is generally directed to modifying graphics rendering by transcoding a serialized command stream.

Background

Modern display devices, such as TVs, monitors, tablets, smartphones, and smartwatches and other wearables, etc., are manufactured in a myriad of different screen sizes and resolutions. Accordingly, modern electronic content, such as movies, TV shows, and music, typically is scaled up or down for presentation on these devices. To do so, existing scaling methods render the graphics pixels to memory and then read, filter, and write those pixels to a copy at a different size. In one example, an application renders a frame by calling commands in a graphics application programming interface (API). Rendering commands then are turned into rendering operations carried out by hardware or software. Some commands render to the screen, while other commands render to off-screen buffers. Subsequently, the buffer containing the image to be scaled is read, filtered, and written out at a larger size.

However, existing scaling methods still fall short in many areas. For example, if an application rendered five squares on a screen at 1280×720p resolution but 1920×1080p resolution was needed, existing scaling methods would render the five squares at 1280×720p, read the 1280×720p pixels, scale up the 1280×720p pixels, and then write the 1280×720p pixels back out at 1920×1080p. As a result, existing scaling methods are slow, require significant computational resources, and result in substantial rendering time to generate scaled graphics.

SUMMARY

Provided herein are system, apparatus, article of manufacture, method and/or computer program product embodiments, and/or combinations and sub-combinations thereof, for modifying the rendering (e.g., changing the rendered position, size, orientation, color, compression, etc.) of graphics and graphics elements by transcoding a serialized stream of graphics commands. In contrast to existing approaches, the embodiments described herein solve these technological problems by intercepting or capturing a serialized command stream of graphics commands, and then modifying the rendering commands to modify (e.g., stretch, shrink, rotate, re-color, etc.) the resulting output, causing the output to be substantially equivalent to the output generated by traditional methods but with substantially no additional writes or memory requirements.

In one illustrative example, if an application issued commands to render five squares on a screen at 1280×720p resolution but 1920×1080p resolution was needed, the embodiments described herein can be configured to intercept or capture those commands, examine them, modify them by multiplying the on-screen data (e.g., destination coordinates) included therein by 1.5, and then send the modified commands to the hardware to generate the 1920×1080p image having the five modified (e.g., scaled-up) squares.

An embodiment is directed to system, apparatus, article of manufacture, method and/or computer program product embodiments, and/or combinations and sub-combinations thereof, for modifying graphics rendering by transcoding a serialized command stream. In a non-limiting embodiment, the apparatus may be a media streaming device, and the serialized command stream may be a serialized stream of graphics commands, to name just two examples. The apparatus includes a memory and a processor that is communicatively coupled to the memory. In operation, in some embodiments, the processor receives a command configured to instruct an application programming interface (API) to render a graphics element. For example, in a case where the command was generated by an application and transmitted by the application to the API, the processor may receive the command by intercepting or capturing the command after transmission of the command by the application and before any processing of the command by the API. Responsive to receiving the command, the processor generates, based on the command, a transcoded command configured to instruct the API to render a modified graphics element by applying a set of modification factors to a portion of the command. Subsequently, the processor transmits the transcoded command to the API for rendering.

There are many exemplary aspects to the system, apparatus, article of manufacture, method and/or computer program product embodiments, and/or combinations and sub-combinations thereof, disclosed herein. For example, embodiments of the present disclosure provide for intercepting or capturing graphics commands intended for a graphics API and modifying those commands before sending them to the API and rendering them in memory. As a result of these and other embodiments described herein, embodiments of the present disclosure provide for faster graphics rendering techniques that utilize fewer computational resources (e.g., memory, GPU percentage). As a further result of these and other embodiments described herein, the rendering time to generate modified graphics is decreased substantially.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
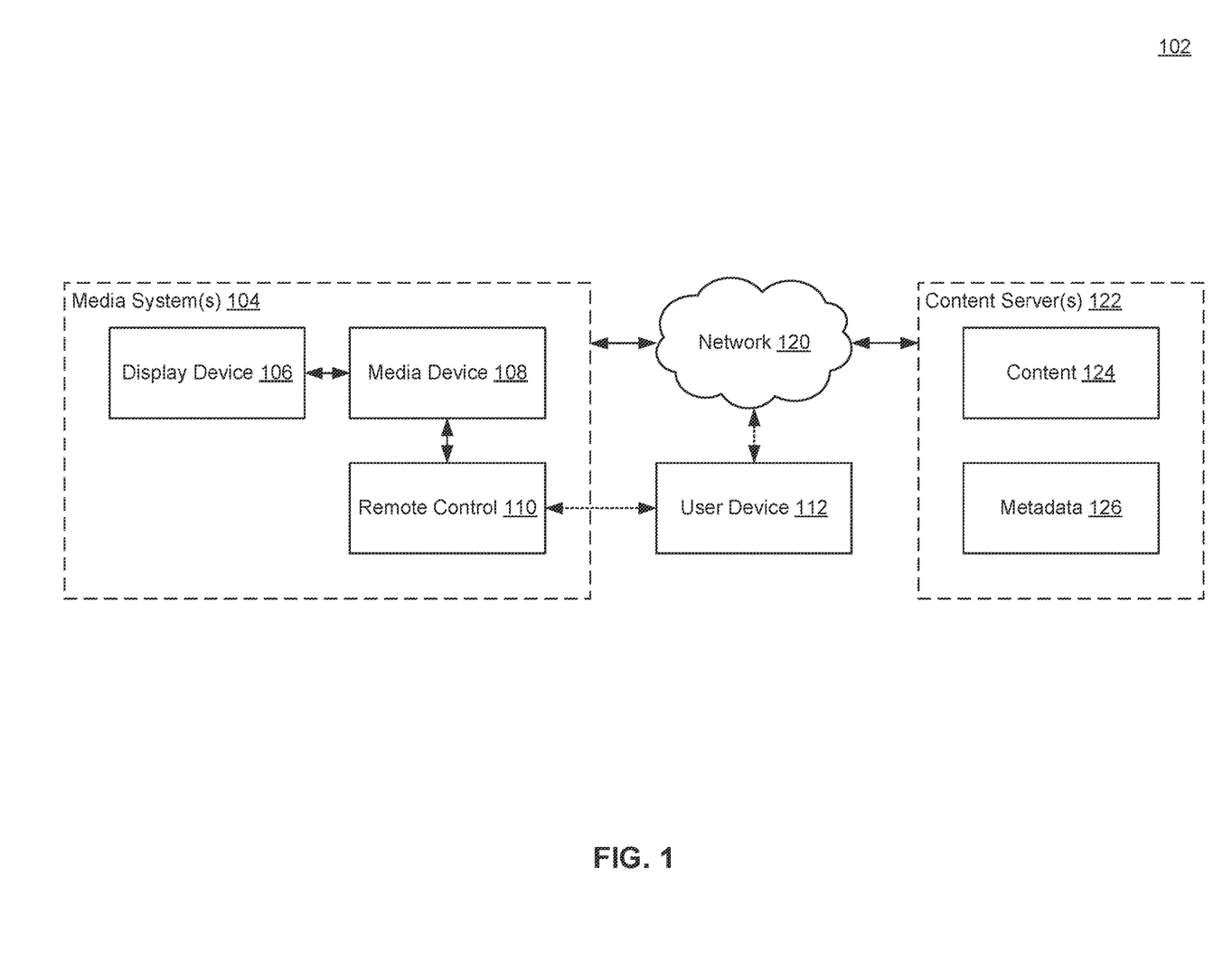
FIG. 1 illustrates a block diagram of a multimedia environment that includes one or more media systems and one or more content servers, according to some embodiments.

FIG. 1 illustrates a block diagram of multimedia environment 102, according to some embodiments. In a non-limiting example, multimedia environment 102 is directed to streaming media.

Multimedia environment 102 may include one or more media systems 104 and one or more content servers 122, communicatively coupled via communications network 120. In various embodiments, communications network 120 can include, without limitation, wired and/or wireless intranet, extranet, Internet, cellular, Bluetooth and/or any other short range, long range, local, regional, global communications network, as well as any combination thereof.

One or more media systems 104 may each include display device 106, media device 108, and remote control 110. Display device 106 may be a monitor, television, computer, smart phone, tablet, and/or projector, to name just a few examples. Media device 108 may be a streaming media device, DVD device, audio/video playback device, cable box, and/or digital video recording device, to name just a few examples. In some embodiments, media device 108 can be a part of, integrated with, operatively coupled to, and/or connected to display device 106. Media device 108 may be configured to communicate with communications network 120.

User device 112 may interact with one or more media systems 104 via remote control 110. Remote control 110 can be any component, part, apparatus or method for controlling media device 108 and/or display device 106, such as a remote control, a tablet, laptop computer, smartphone, on-screen controls, integrated control buttons, or any combination thereof, to name just a few examples.

One or more content servers 122 (also called content sources) may each include databases to store content 124 and metadata 126. Content 124 may include any combination of music, videos, movies, TV programs, multimedia, images, still pictures, text, graphics, gaming applications, advertisements, software, and/or any other content or data objects in electronic form. In some embodiments, metadata 126 includes data about content 124. For example, metadata 126 may include associated or ancillary information indicating or related to writer, director, producer, composer, artist, actor, summary, chapters, production, history, year, trailers, alternate versions, related content, applications, and/or any other information pertaining or relating to content 124. Metadata 126 may also or alternatively include links to any such information pertaining or relating to content 124. Metadata 126 may also or alternatively include one or more indexes of content 124, such as but not limited to a trick mode index.

Figure 2:
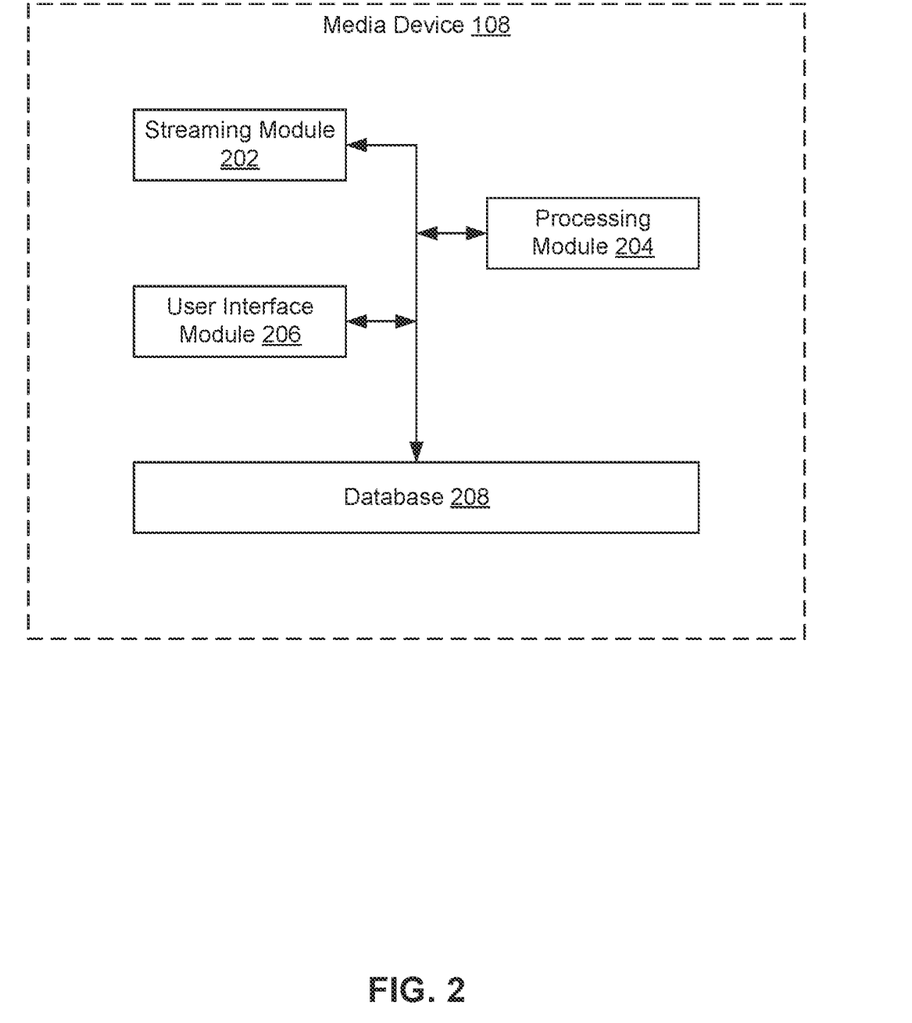
FIG. 2 illustrates a block diagram of a media device, according to some embodiments.

FIG. 2 illustrates an example block diagram of media device 108, according to some embodiments. Media device 108 may include streaming module 202, processing module 204, user interface module 206, and database 208.

Now referring to FIGS. 1 and 2, in some embodiments, user device 112 may use remote control 110 to interact with user interface module 206 of media device 108 to select content, such as a movie, TV show, music, book, application, game, etc. Streaming module 202 of media device 108 may request the selected content from one or more content servers 122 over communications network 120. One or more content servers 122 may transmit the requested content to streaming module 202. Media device 108 may transmit the received content to display device 106 for presentation to a user of user device 112. In streaming embodiments, streaming module 202 may transmit the content to display device 106 in real time or near real time as it receives such content from one or more content servers 122. In non-streaming embodiments, media device 108 may buffer or store the content received from one or more content servers 122 in database 208 for later playback on display device 106.

Figure 3:
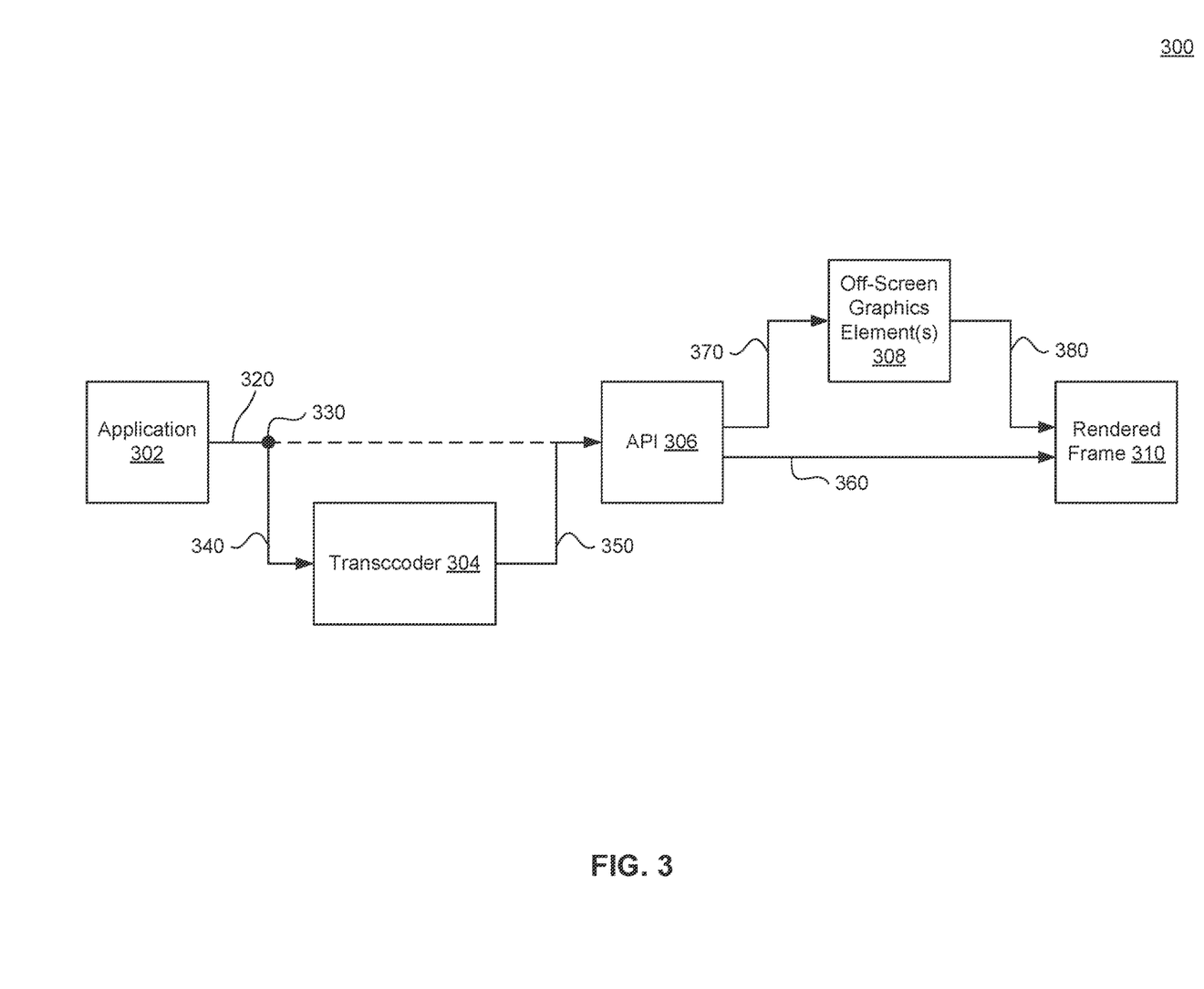
FIG. 3 is a block diagram of a system for modifying graphics rendering by transcoding a serialized command stream, according to some embodiments.

FIG. 3 is a block diagram of an example system 300 for modifying graphics rendering by transcoding a serialized command stream, according to some embodiments. In some embodiments, the example system 300 can include application 302, transcoder 304, API 306 (e.g., a graphics API), one or more off-screen graphics elements 308, and rendered frame 310.

At 320, application 302 generates one or more commands configured to instruct API 306 to render a graphics element in rendered frame 310 (e.g., a frame, screen, plane, window, image, or overlay (e.g., display screen overlay), or any other suitable element). For example, application 302 may attempt to render a frame by calling one or more graphics commands in API 306.

At 330, transcoder 304 intercepts (e.g., without the knowledge of either application 302 or API 306) or captures (e.g., with the knowledge of one or both of application 302 and API 306) the commands. In some embodiments, transcoder 304 may receive (e.g., by interception or capture) multiple commands generated by application 302 and generate a single command based on those multiple commands or a subset thereof. In some embodiments, transcoder 304 may receive a single command generated by application 302 and generate multiple commands based on that single command. In some embodiments, transcoder 304 generates a serialized version of the intercepted or captured commands for transcoding (e.g., modification of one or more of the intercepted or captured commands).

Transcoder 304 determines whether to alter one or more of the commands in the serialized version of the intercepted or captured commands. In some embodiments, transcoder 304 modifies commands targeting onscreen pixels to generate transcoded commands configured to result in approximately the same pixel output as graphics that have been rendered and stored to memory prior to modification. In some embodiments, transcoder 304 leaves commands targeting off-screen pixels unchanged. In one illustrative and non-limiting example, transcoder 304 can be configured to modify an example command to generate an example rectangle in an example frame by generating scaling factors and applying the generated scaling factors to the on-screen destination data included in the command according to the following example pseudocode (which is provided for illustrative purposes and is not limiting):

Received Command (e.g., Intercepted or Captured Command):
    copy_rect(srcX, srcY, srcW, srcH, dstX, dstY, dstW, dstH),
    where srcX and srcY refer to source X and Y coordinates in the XY-plane,
    srcW and srcH refer to source width and height,
    dstX and dstY refer to destination X and Y coordinates in the XY-plane, and
    dstW and dstH refer to destination width and height.
Transcoded Command:
    copy_rect(srcX, srcY, srcW, srcH, dstX*scaleX, dstY*scaleY, dstW*scaleX, dstH*scaleY),
    where scaleX and scaleY refer to X and Y scaling factors.

As shown above, the copy_rect command includes: a source rectangle that is not modified by transcoder 304 because the source rectangle is off screen; and a destination rectangle that is modified by transcoder 304 to make the destination rectangle larger than what application 302 expected it to be (e.g., destination X, destination Y, destination width, and destination height are all scaled up by a subset of scaling factors).

In some embodiments, transcoder 304 can be configured to generate the transcoded command by accessing a database that includes a set of transcoding rules respectively associated with a set of commands (e.g., graphics rendering commands). For example, the set of rules can include a subset of copy_rect transcoding rules stored in association with a copy_rect command. The subset of copy_rect transcoding rules can include, for example, electronic instructions to: (i) not modify the source data; (ii) modify the destination data; and (iii) if the source data is on-screen source data, modify the source data as well.

In another illustrative and non-limiting example, transcoder 304 can receive an example command to close application 302 in rendered frame 310, referred to in this example as a "delete command." For example, application 302 can generate a delete command configured to slide a window associated with application 302 off the side of rendered frame 310 on exit. Without the knowledge of application 302 or API 306, transcoder 304 may transcode the received delete command to instruct API 306 to delete the window in a different manner than the manner called for by application 302.

In some embodiments, transcoder 304 may transcode the received delete command without generating new frames such that there is a one-to-one (1:1) relationship or correlation between input frames and output frames. For example, transcoder 304 can be configured to modify the received delete command by generating pixel alteration factors configured to fade the window associated with application 302 in rendered frame 310 on exit rather than sliding it off the side of rendered frame 310 as commanded by application 302. In this example, application 302 generates a series of commands configured to generate a series of frames each having a window with a modified X location in rendered frame 310. Transcoder 304 intercepts the series of commands and modifies them to fade the window in rendered frame 310 rather than modify its X location. In other words, transcoder 304 can transcode the received commands that intended to modify the X location of the window into transcoded commands that instead modify the transparency of the window, thereby altering the exit effect without the knowledge of application 302 or API 306. In short, when application 302 wanted 20 frames that moved the window off screen on exit, transcoder 304 instead instructed API 306 to generate 20 frames that faded the window on exit.

In other embodiments, transcoder 304 may transcode the received delete command into multiple animated frames such that there is not a 1:1 relationship or correlation between input frames and output frames (e.g., by replaying all the commands to generate new frames). For example, transcoder 304 can be configured to modify the received delete command by generating scaling factors configured to shrink, spin, and throw away the window associated with application 302 in rendered frame 310 rather than sliding it off the side of rendered frame 310 as commanded by application 302. In this example, transcoder 304 can modify the destination X and Y coordinates, the destination width and height, and the destination orientation so that the icon becomes smaller and spins as it is removed from rendered frame 310 rather than being deleted as called for by the received delete command.

In another illustrative and non-limiting example, transcoder 304 can be configured to modify the colors in graphics data. For example, transcoder 304 can receive an example command to draw pixels at a certain color in an example frame. Transcoder 304 can be configured to modify the received example command by generating pixel alteration factors configured to alter the color of the pixels and applying those pixel alteration factors to the pixels to generate a transcoded command configured to instruct API 306 to render, in rendered frame 310, an altered-color version of the to-be-drawn pixels called for the received example command. In another example, where the received example command is a command to generate a rectangular image, transcoder 304 can be configured to modify the received example command by applying pixel alteration factors to the pixels of the to-be-generated rectangular image in the received example command to generate a transcoded command configured to instruct API 306 to render, in rendered frame 310, a version of the rectangular image that is slightly more red than the rectangular image called for by the received example command.

In another illustrative and non-limiting example, application 302 may be sending compressed pixel data to API 306, such as an image (e.g., a PNG image), and transcoder 304 can be configured to modify that image. For example, transcoder 304 can decompress the image, modify the pixel data, and then transmit the decompressed, modified pixel data to API 306 using a different command that accepts uncompressed data to eliminate substantially the computing costs (e.g., memory, CPU, GPU) associated with recompressing the image to a new PNG image, sending it to API 306, and decompressing it again.

At 350, transcoder 304 transmits the transcoded commands to API 306. The transcoded commands transmitted to API 306 can include, for example, one or more modified commands and one or more unmodified commands.

At 360, API 306 processes the transcoded commands to generate one or more on-screen graphics elements for use in generation of rendered frame 310. The one or more on-screen graphics elements may include one or more unmodified on-screen graphics elements and one or more modified on-screen graphics elements. The one or more modified on-screen graphics elements can include, for example, one or more modified on-screen squares, rectangles, cylinders, fonts, images, sequences of images, videos, overlays, any other suitable graphics elements, and any combinations thereof.

At 370, API 306 processes the transcoded commands to generate one or more off-screen graphics elements 308. One or more off-screen graphics elements 308 may include one or more unmodified off-screen graphics elements (e.g., configured to remain off-screen) and one or more modified off-screen graphics elements (e.g., configured to be included on-screen in rendered frame 310 via 380). The one or more modified off-screen graphics elements can include, for example, one or more modified off-screen squares, rectangles, cylinders, fonts, images, sequences of images, videos, overlays, any other suitable graphics elements, and any combinations thereof.

At 380, API 306 utilizes one or more off-screen graphics elements 308 in the generation of rendered frame 310. In some embodiments, at 360, 370, and 380, API 306 generates rendered frame 310 based on one or more transcoded commands, one or more non-transcoded commands (e.g., relating to some off-screen graphics elements), one or more off-screen graphics elements 308 (including, but not limited to, one or more unmodified off-screen graphics elements, one or more modified off-screen graphics elements, or a combination thereof), one or more on-screen graphics elements (including, but not limited to, one or more unmodified on-screen graphics elements, one or more modified on-screen graphics elements, or a combination thereof), any other suitable command or graphics element, or any combinations thereof. In some embodiments, the one or more modified graphics elements may not "exist" anywhere other than in rendered frame 310. For example, a resized square may not exist as an element in regular size that then is resized. Rather, the resized square simply may have been drawn as a smaller square by API 306 in rendered frame 310 based on a transcoded command received from transcoder 304.

In some embodiments, in 350, API 306 receives one or more on-screen commands from transcoder 304 and, in 360, processes the one or more on-screen commands to draw one or more on-screen graphics elements directly to the rendered frame 310. The one or more on-screen commands can include one or more modified on-screen commands (e.g., transcoded by transcoder 304) and one or more unmodified on-screen commands (e.g., not transcoded by transcoder 304). For example, one illustrative example of a modified on-screen command that can be processed by the API 306 in 360 is where the command includes on-screen source data and on-screen destination data associated with a graphics element, such as when copying the left half of a screen to the right half of the screen.

In some embodiments, in 350, API 306 receives one or more off-screen commands from transcoder 304 and, in 370, processes the one or more off-screen commands to draw one or more off-screen graphics elements 308. The one or more off-screen commands can include one or more modified off-screen commands (e.g., transcoded by transcoder 304) and one or more unmodified off-screen commands (e.g., not transcoded by transcoder 304). Subsequently, in 380, API 306 processes one or more additional commands (e.g., off-to-on-screen commands) to draw from the off-screen graphics elements 308 to rendered frame 310. The one or more additional commands can include one or more modified additional commands (e.g., transcoded by transcoder 304) and one or more unmodified additional commands (e.g., not transcoded by transcoder 304). For example, the copy_rect( ) pseudo code described above is one illustrative example of a modified additional command that can be processed by the API 306 in 380.

Figure 4:
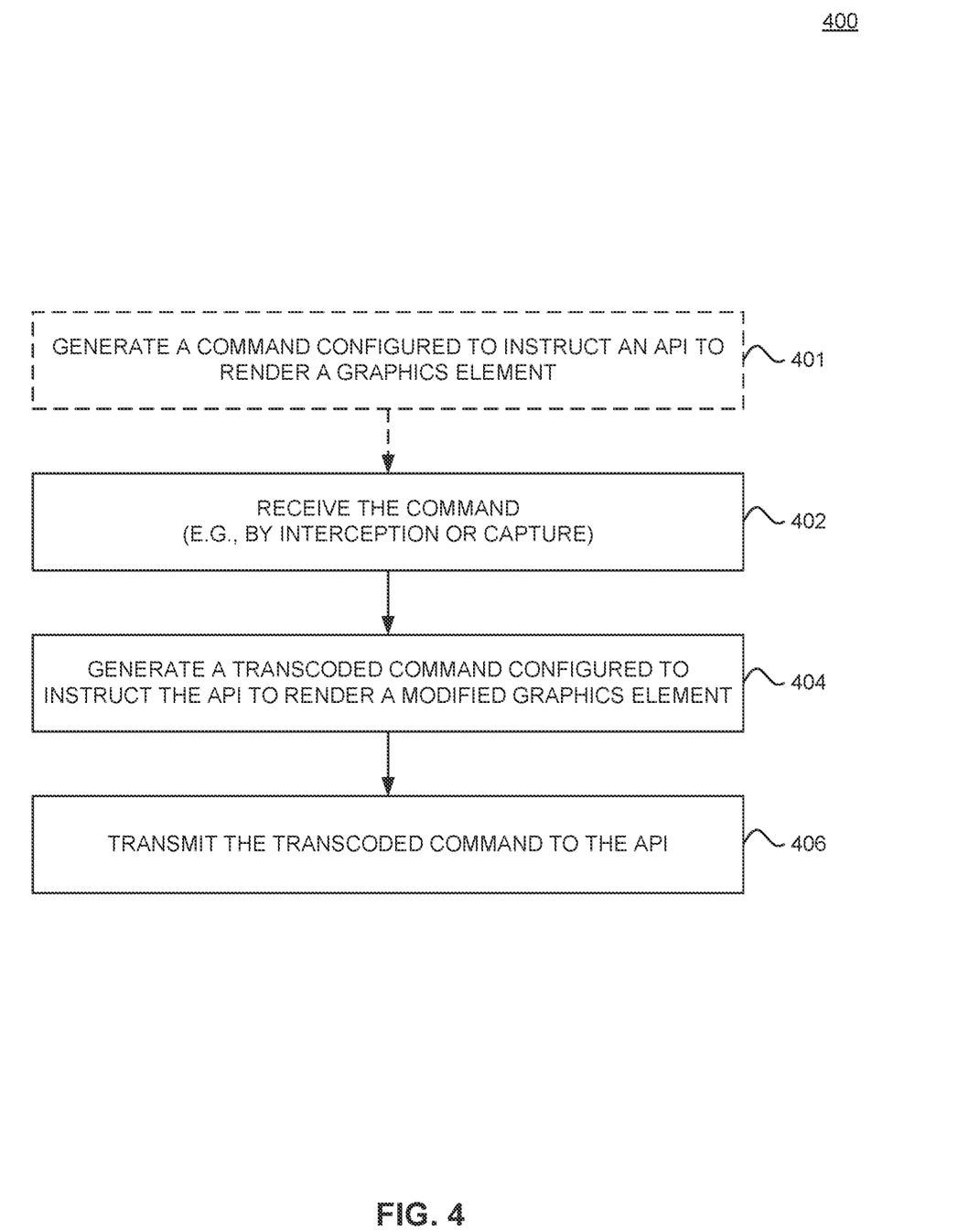
FIG. 4 is a flowchart illustrating a process for modifying graphics rendering by transcoding a serialized command stream, according to some embodiments.

FIG. 4 is a flowchart for a method 400 for modifying graphics rendering by transcoding a serialized command stream, according to an embodiment. Method 400 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIG. 3. However, method 400 is not limited to that example embodiment.

Optionally, in 401, application 302 generates one or more commands (e.g., graphics commands) configured to instruct API 306 to render a graphics element in a frame.

In 402, transcoder 304 receives (e.g., by interception or capture) the one or more commands generated by application 302. The graphics element can include a square, a rectangle, a cylinder, a font, an image, a sequence of images (e.g., video), an icon, any other suitable graphics element, an overlay including any of these graphics elements, or any combination thereof. In some embodiments, the one or more commands may include: off-screen data associated with the graphics element: and on-screen data associated with the graphics element. The off-screen data can include, for example, off-screen source data (e.g., srcX, srcY, srcW, and srcH) associated with the graphics element; and on-screen destination data (e.g., dstX, dstY, dstW, and dstH) associated with the graphics element. In other embodiments, the one or more commands may include on-screen source data and on-screen destination data associated with the graphics element, such as where the one or more commands are configured to instruct API 306 to copy the left half of a screen (or a horizontally-flipped copy of the left half of the screen) to the right half of the screen.

In some embodiments, the one or more commands may have been generated by application 302 and transmitted by application 302 to API 306. In some embodiments, transcoder 304 may receive (e.g., intercept or capture) the one or more commands after transmission of the one or more commands by application 302 and before any processing of the one or more commands by API 306. In one example, in some embodiments, API 306 may receive one or more of the one or more commands or one or more portions thereof (e.g., relating to one or more off-screen graphics elements 308, or one or more operations that are not to be transcoded). In another example, in some embodiments, API 306 may never receive the one or more commands or any portion thereof and instead receive only a transcoded versions of the one or more commands.

In some embodiments, application 302 and API 306 may have no knowledge of transcoder 304, such as in cases where application 302 and API 306 are incapable of being modified (e.g., by example system 300) to include knowledge of transcoder 304. For example, without the knowledge of either application 302 or API 306, transcoder 304 may intercept the one or more commands after transmission of the one or more commands by application 302 but before any receipt of the one or more commands by API 306. In another example, transcoder 304 may prevent receipt of the one or more commands by API 306 by, for example, intercepting and transcoding the one or more commands before they are received by API 306.

In some embodiments, application 302, API 306, or both may be modified (e.g., by example system 300) to include knowledge of transcoder 304. For example, with the knowledge of one or both of application 302 and API 306, transcoder 304 may capture the one or more commands after receipt of the one or more commands by API 306 but before any processing of the one or more commands by API 306. In another example, transcoder 304 may prevent processing of the one or more commands by API 306 by, for example, capturing and transcoding the one or more commands after they are received by API 306 but before they are processed by API 306.

In some embodiments, transcoder 304 may receive multiple commands generated by application 302 and generate a single command for transcoding (e.g., possible modification) based on those multiple commands or a subset thereof. In some embodiments, transcoder 304 may receive a single command generated by application 302 and generate multiple commands for transcoding based on that single command. In some embodiments, transcoder 304 may receive a set of commands configured to instruct API 306 to render a set of graphics elements in rendered frame 310 and generate a serialized set of commands based on the received set of commands, where the serialized set of commands includes the one or more commands.

In 404, transcoder 304 generates, based on the received one or more commands (e.g., the one or more intercepted or captured commands generated by application 302), one or more transcoded commands configured to instruct API 306 to render one or more modified graphics elements in rendered frame 310 by applying a set of modification factors to a portion or subset of the one or more commands (e.g., on-screen data associated with the graphics element). In some embodiments, the set of modification factors can include a subset of scaling factors (e.g., position, size, orientation, and other suitable scaling factors), a subset of pixel alteration factors (e.g., color, hue, luminance, chrominance, and other suitable pixel alteration factors), a subset of decompression factors (e.g., decoding, dequantization, inverse transformation, and other suitable decompression factors), any other suitable modification factors, or any combination thereof. The modified graphics element can include, for example, one or more modified squares, rectangles, cylinders, fonts, images, sequences of images, overlays, other suitable graphics elements, or any combination thereof.

In some embodiments, where the one or more commands include off-screen data (e.g., off-screen source data such as srcX, srcY, srcW, and srcH) and on-screen data (e.g., on-screen destination data such as dstX, dstY, dstW, and dstH) associated with the graphics element, applying the set of modification factors to the portion or subset of the one or more commands can include: applying the set of modification factors to the on-screen data associated with the graphics element (e.g., applying a subset of scaling factors, such as scaleX and scaleY, to the on-screen destination data, resulting in scaled destination data such as dstX*scaleX, dstY*scaleY, dstW*scaleX, and dstH*scaleY); and not applying the set of modification factors to the off-screen data associated with the graphics element (e.g., resulting in unmodified off-screen source data such as srcX, srcY, srcW, and srcH). In such embodiments, transcoder 304 leaves commands targeting off-screen pixels unchanged. For example, for a serialized set of graphics commands that includes commands to draw a rectangle to off-screen memory and then copy that rectangle to the screen, transcoder 304 may intercept and modify the command to copy the rectangle to the screen without modifying command to draw the rectangle to off-screen memory.

In some embodiments, where the one or more commands include on-screen source data and on-screen destination data associated with the graphics element, such as when copying the left half of a screen to the right half of the screen, applying the set of modification factors to the portion or subset of the one or more commands can include: applying the set of modification factors to the on-screen data associated with the graphics element (e.g., applying a subset of scaling factors, such as scaleX and scaleY, to the on-screen source data and the on-screen destination data, resulting in scaled on-screen data such as srcX*scaleX, srcY*scaleY, srcW*scaleX, srcH*scaleY, dstX*scaleX, dstY*scaleY, dstW*scaleX, and dstH*scaleY).

In some embodiments, transcoder 304 may generate a serialized set of transcoded commands based on a serialized set of commands, where the serialized set of transcoded commands includes the one or more transcoded commands.

In an embodiment, 404 can be implemented according to the example pseudocode described with reference to transcoder 304 shown in FIG. 3. However, in other embodiments, 404 can be implemented using other code, pseudocode, algorithms, modification factors, or combinations thereof.

In 406, transcoder 304 transmits the one or more transcoded commands to API 306. In some embodiments, API 306 receives the one or more transcoded commands and renders one or more modified graphics elements (and, in some embodiments, one or more unmodified graphics elements) in rendered frame 310 based on the one or more transcoded commands.

Figure 5:
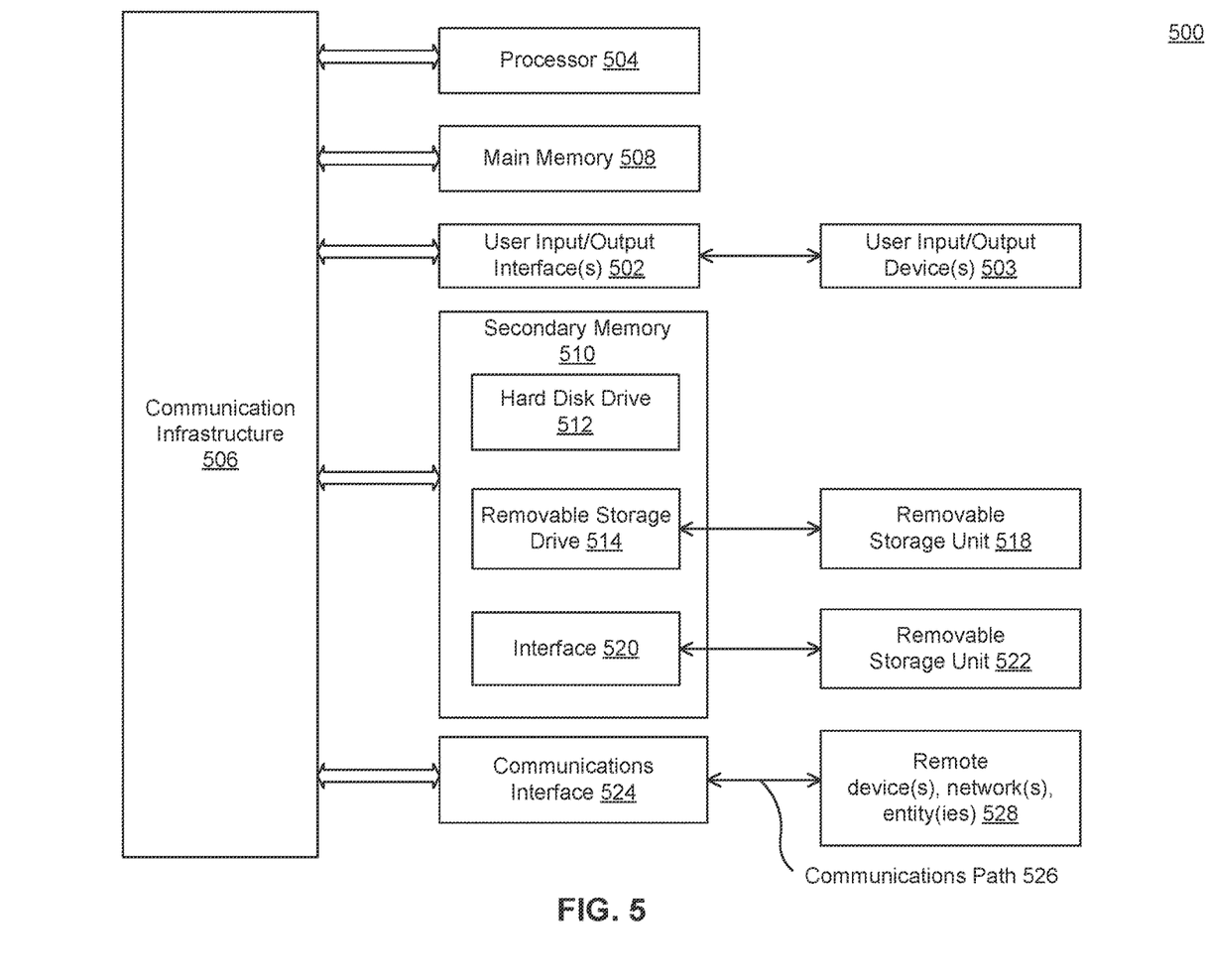
FIG. 5 illustrates an example computer system useful for implementing various embodiments.

Various embodiments and/or components therein can be implemented, for example, using one or more computer systems, such as computer system 500 shown in FIG. 5. Computer system 500 can be any computer or computing device capable of performing the functions described herein. For example, computer system 500 can be used to implement any of the embodiments described herein, as well as combinations and sub-combinations thereof.

Computer system 500 includes one or more processors (also called central processing units, or CPUs), such as processor 504. Processor 504 is connected to communications infrastructure 506 (e.g., a bus).

In some embodiments, processor 504 can be a graphics processing unit (GPU). In some embodiments, a GPU may be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communications infrastructure 506 through user input/output interface(s) 502.

Computer system 500 also includes main memory 508 (e.g., a primary memory or storage device), such as random access memory (RAM). Main memory 508 can include one or more levels of cache. Main memory 508 may have stored therein control logic (i.e., computer software) and/or data.

Computer system 500 can also include one or more secondary storage devices or memories such as secondary memory 510. Secondary memory 510 can include, for example, hard disk drive 512, removable storage drive 514 (e.g., a removable storage device), or both. Removable storage drive 514 can be a floppy disk drive, a magnetic tape drive, a compact disk drive, an optical storage device, tape backup device, and/or any other storage device/drive.

Removable storage drive 514 can interact with removable storage unit 518. Removable storage unit 518 includes a computer usable or readable storage device having stored thereon computer software (e.g., control logic) and/or data. Removable storage unit 518 can be a floppy disk, magnetic tape, compact disk, DVD, optical storage disk, and/any other computer data storage device. Removable storage drive 514 may read from and/or write to removable storage unit 518.

In some embodiments, secondary memory 510 can include other means, devices, components, instrumentalities or other approaches for allowing computer programs and/or other instructions and/or data to be accessed by computer system 500. Such means, devices, components, instrumentalities or other approaches can include, for example, removable storage unit 522 and interface 520. Examples of removable storage unit 522 and interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communications interface 524 (e.g., a network interface). Communications interface 524 may enable computer system 500 to communicate and interact with any combination of external or remote devices, external or remote networks, remote entities, etc. (individually and collectively referenced by reference number 528). For example, communications interface 524 can allow computer system 500 to communicate with external or remote devices 528 over communications path 526, which can be wired, wireless, or a combination thereof, and which can include any combination of LANs, WANs, the Internet, etc. Control logic and/or data can be transmitted to and from computer system 500 via communications path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions): "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards and specifications associated with images, audio, video, streaming (e.g., adaptive bitrate (ABR) streaming, content feeds), high-dynamic-range (HDR) video, text (e.g., closed captioning, subtitles), metadata (e.g., content metadata), data interchange, data serialization, data markup, digital rights management (DRM), encryption, any other suitable function or purpose, or any combination thereof. Alternatively, proprietary data structures, formats or schemas may be used, either exclusively or in combination with another standard or specification.

Standards and specifications associated with images may include, but are not limited to, Base Index Frames (BIF), Bitmap (BMP), Graphical Interchange Format (GIF), Joint Photographic Experts Group (JPEG or JPG), Portable Network Graphics (PNG), any other suitable techniques (e.g., functionally similar representations), any predecessors, successors, and variants thereof, and any combinations thereof.

Standards and specifications associated with audio may include, but are not limited to, Advanced Audio Coding (AAC), AAC High Efficiency (AAC-HE), AAC Low Complexity (AAC-LC), Apple Lossless Audio Codec (ALAC), Audio Data Transport Stream (ADTS), Audio Interchange File Format (AIFF), Digital Theater Systems (DTS), DTS Express (DTSE), Dolby Digital (DD or AC3), Dolby Digital Plus (DD+ or Enhanced AC3 (EAC3)), Dolby AC4, Dolby Atmos, Dolby Multistream (MS12), Free Lossless Audio Codec (FLAC), Linear Pulse Code Modulation (LPCM or PCM), Matroska Audio (MKA), Moving Picture Experts Group (MPEG)-1 Part 3 and MPEG-2 Part 3 (MP3), MPEG-4 Audio (e.g., MP4A or M4A), Ogg, Ogg with Vorbis audio (Ogg Vorbis), Opus, Vorbis, Waveform Audio File Format (WAVE or WAV), Windows Media Audio (WMA), any other suitable techniques, any predecessors, successors, and variants thereof, and any combinations thereof.

Standards and specifications associated with video may include, but are not limited to, Alliance for Open Media (AOMedia) Video 1 (AV1), Audio Video Interleave (AVI), Matroska Video (MKV), MPEG-4 Part 10 Advanced Video Coding (AVC or H.264), MPEG-4 Part 14 (MP4), MPEG-4 Video (e.g., MP4V or M4V), MPEG-H Part 2 High Efficiency Video Coding (HEVC or H.265), QuickTime File Format (QTFF or MOV), VP8, VP9, WebM, Windows Media Video (WMV), any other suitable techniques, any predecessors, successors, and variants thereof, and any combinations thereof.

Standards and specifications associated with streaming may include, but are not limited to, Adaptive Streaming over HTTP, Common Media Application Format (CMAF), Direct Publisher JavaScript Object Notation (JSON), HD Adaptive Streaming, HTTP Dynamic Streaming, HTTP Live Streaming (HLS), HTTP Secure (HTTPS), Hypertext Transfer Protocol (HTTP), Internet Information Services (IIS) Smooth Streaming (SMOOTH), Media RSS (MRSS), MPEG Dynamic Adaptive Streaming over HTTP (MPEG-DASH or DASH), MPEG transport stream (MPEG-TS or TS), Protected Interoperable File Format (PIFF), Scalable HEVC (SHVC), any other suitable techniques, any predecessors, successors, and variants thereof, and any combinations thereof.

Standards and specifications associated with HDR video may include, but are not limited to, Dolby Vision, HDR10 Media Profile (HDR10), HDR10 Plus (HDR10+), Hybrid Log-Gamma (HLG), Perceptual Quantizer (PQ), SL-HDR1, any other suitable techniques, any predecessors, successors, and variants thereof, and any combinations thereof.

Standards and specifications associated with text, metadata, data interchange, data serialization, and data markup may include, but are not limited to, Internet Information Services (IIS) Smooth Streaming Manifest (ISM), IIS Smooth Streaming Text (ISMT), Matroska Subtitles (MKS), SubRip (SRT), Timed Text Markup Language (TTML), Web Video Text Tracks (WebVTT or WVTT), Comma-Separated Values (CSV), Extensible Markup Language (XML), Extensible Hypertext Markup Language (XHTML), XML User Interface Language (XUL), JSON, MessagePack, Wireless Markup Language (WML), Yet Another Markup Language (YAML), any other suitable techniques, any predecessors, successors, and variants thereof, and any combinations thereof.

Standards and specifications associated with DRM and encryption may include, but are not limited to, Advanced Encryption Standard (AES) (e.g., AES-128, AES-192, AES-256), Blowfish (BF), Cipher Block Chaining (CBC), Cipher Feedback (CFB), Counter (CTR), Data Encryption Standard (DES), Triple DES (3DES), Electronic Codebook (ECB), FairPlay, Galois Message Authentication Code (GMAC), Galois/Counter Mode (GCM), High-bandwidth Digital Content Protection (HDCP), Output Feedback (OFB), PlayReady, Propagating CBC (PCBC), Trusted Execution Environment (TEE), Verimatrix, Widevine, any other suitable techniques, any predecessors, successors, and variants thereof, and any combinations thereof, such as AES-CBC encryption (CBCS), AES-CTR encryption (CENC).

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. An apparatus, comprising:
   a memory; and
   at least one processor coupled to the memory and configured to perform operations, the operations comprising:
      receiving a command configured to instruct an application programming interface (API) to render a graphics element, wherein the command includes off-screen data associated with the graphics element and on-screen data associated with the graphics element;
      generating, based on the command and a set of modification factors, a transcoded command configured to instruct the API to render a modified graphics element, wherein generating the transcoded command comprises applying the set of modification factors to the on-screen data associated with the graphics element but not applying the set of modification factors to the off-screen data associated with the graphics element; and
      transmitting the transcoded command to the API to cause the API to render the modified graphics element.

2. The apparatus of claim 1, wherein:
   the off-screen data comprises source data associated with the graphics element; and
   the on-screen data comprises destination data associated with the graphics element.

3. The apparatus of claim 1, wherein applying the set of modification factors to the on-screen data associated with the graphics element comprises:
   applying a set of scaling factors to the on-screen data associated with the graphics element.

4. The apparatus of claim 1, wherein generating the transcoded command comprises:
   obtaining a transcoding rule associated with the command from a database that stores different transcoding rules associated with respective different commands; and
   generating the transcoded command in accordance with the transcoding rule.

5. The apparatus of claim 1, wherein the graphics element comprises one of a square, a rectangle, a cylinder, a font, an image, a sequence of images, or an overlay.

6. The apparatus of claim 1, wherein receiving the command comprises:
   receiving multiple commands generated by an application; and
   serializing the multiple commands to generate a set of serialized commands.

7. The apparatus of claim 1, wherein receiving the command comprises:
   receiving multiple commands generated by an application; and
   generating the command based on the multiple commands.

8. A computer-implemented method, comprising:
   receiving, by at least one computer processor, a command configured to instruct an application programming interface (API) to render a graphics element, wherein the command includes off-screen data associated with the graphics element and on-screen data associated with the graphics element;

generating, based on the command and a set of modification factors, a transcoded command configured to instruct the API to render a modified graphics element, wherein generating the transcoded command comprises applying the set of modification factors to the on-screen data associated with the graphics element but not applying the set of modification factors to the off-screen data associated with the graphics element; and transmitting the transcoded command to the API to cause the API to render the modified graphics element.

9. The computer-implemented method of claim 8, wherein:

the off-screen data comprises source data associated with the graphics element; and the on-screen data comprises destination data associated with the graphics element.

10. The computer-implemented method of claim 8, wherein applying the set of modification factors to the on-screen data associated with the graphics element comprises:

applying a set of scaling factors to the on-screen data associated with the graphics element.

11. The computer-implemented method of claim 8, wherein generating the transcoded command comprises:

obtaining a transcoding rule associated with the command from a database that stores different transcoding rules associated with respective different commands; and generating the transcoded command in accordance with the transcoding rule.

12. The computer-implemented method of claim 8, wherein the graphics element comprises one of a square, a rectangle, a cylinder, a font, an image, a sequence of images, or an overlay.

13. The computer-implemented method of claim 8, wherein receiving the command comprises:

receiving multiple commands generated by an application; and serializing the multiple commands to generate a set of serialized commands.

14. The computer-implemented method of claim 8, wherein receiving the command comprises:

receiving multiple commands generated by an application; and generating the command based on the multiple commands.

15. A non-transitory computer-readable medium having instructions stored thereon that, when executed by at least one computing device, cause the at least one computing device to perform operations comprising:

receiving a command configured to instruct an application programming interface (API) to render a graphics element, wherein the command includes off-screen data associated with the graphics element and on-screen data associated with the graphics element;

generating, based on the command and a set of modification factors, a transcoded command configured to instruct the API to render a modified graphics element, wherein generating the transcoded command comprises applying the set of modification factors to the on-screen data associated with the graphics element but not applying the set of modification factors to the off-screen data associated with the graphics element; and transmitting the transcoded command to the API to cause the API to render the modified graphics element.

16. The non-transitory computer-readable medium of claim 15, wherein:

the off-screen data comprises source data associated with the graphics element; and the on-screen data comprises destination data associated with the graphics element.

17. The non-transitory computer-readable medium of claim 15, wherein applying the set of modification factors to the on-screen data associated with the graphics element comprises:

applying a set of scaling factors to the on-screen data associated with the graphics element.

18. The non-transitory computer-readable medium of claim 15, wherein generating the transcoded command comprises:

obtaining a transcoding rule associated with the command from a database that stores different transcoding rules associated with respective different commands; and generating the transcoded command in accordance with the transcoding rule.

19. The non-transitory computer-readable medium of claim 15, wherein receiving the command comprises:

receiving multiple commands generated by an application; and serializing the multiple commands to generate a set of serialized commands.

20. The non-transitory computer-readable medium of claim 15, wherein receiving the command comprises:

receiving multiple commands generated by an application; and generating the command based on the multiple commands.

\* \* \* \* \*

UNITED STATES PATENT AND TRADEMARK OFFICE
CERTIFICATE OF CORRECTION

PATENT NO. : 12,079,899 B2
APPLICATION NO. : 18/144793
DATED : September 3, 2024
INVENTOR(S) : Sottek Page 1 of 1

It is certified that error appears in the above-identified patent and that said Letters Patent is hereby corrected as shown below:

On the Title Page

Column 1, Item (71), Under "Applicant", Line 1, delete "CT" and insert -- CA --, therefor.

In the Specification

In Column 8, Line 9, delete "element" and insert -- element; --, therefor.

In Column 11, Line 30, delete "solutions):" and insert -- solutions); --, therefor.

Signed and Sealed this
Sixteenth Day of September, 2025

Coke Morgan Stewart
*Acting Director of the United States Patent and Trademark Office*